United States Patent
Pollack et al.

(10) Patent No.: US 7,230,344 B2
(45) Date of Patent: Jun. 12, 2007

(54) APPARATUS AND METHOD FOR TRANSIENT AND UNINTERRUPTIBLE POWER

(75) Inventors: Jerry J. Pollack, Chardon, OH (US); Michael J. Melfi, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 203 days.

(21) Appl. No.: 10/944,064

(22) Filed: Sep. 17, 2004

(65) Prior Publication Data

US 2006/0061334 A1    Mar. 23, 2006

(51) Int. Cl.
  *F02D 29/06*  (2006.01)
(52) U.S. Cl. ............ 290/40 C; 290/38 R; 322/14; 322/10; 322/29; 322/4; 322/8; 322/28
(58) Field of Classification Search .......... 290/40 C, 290/38 R; 322/14, 10, 29, 4, 8, 28
See application file for complete search history.

(56) References Cited

U.S. PATENT DOCUMENTS

| 4,355,276 | A | * | 10/1982 | Vittay ........................ 322/4 |
| 4,540,930 | A | * | 9/1985 | Siedband .................... 322/4 |
| 4,825,139 | A | * | 4/1989 | Hamelin et al. ............. 322/90 |
| 4,827,152 | A | * | 5/1989 | Farkas ........................ 307/68 |
| 5,932,935 | A | * | 8/1999 | Clifton et al. ............... 307/60 |
| 6,169,390 | B1 | * | 1/2001 | Jungreis ...................... 322/4 |
| 6,274,942 | B1 | * | 8/2001 | Pels ........................ 290/40 B |
| 6,365,983 | B1 | * | 4/2002 | Masberg et al. ......... 290/40 C |

* cited by examiner

*Primary Examiner*—Darren Schuberg
*Assistant Examiner*—Iraj Mohandesi
(74) *Attorney, Agent, or Firm*—Patrick S. Yoder; Alexander M. Gerasimow

(57) ABSTRACT

In accordance with certain exemplary embodiments, the present technique provides methods and apparatus for providing transient and uninterrupted power to protected loads. As one example, the present invention provides an induction device that operates as an induction motor to energize a kinetic energy storage device, such as a flywheel, during conventional operating conditions. However, in the event of a loss of primary power, the induction device, which is fed ac power at variable frequencies, begins to operate as an induction generator. For example, by varying the frequency of the input ac power such that the synchronous speed of the motor is exceeded by the rotating flywheel, the induction device acts as an induction generator and provides a transient operating power to the downstream loads until an auxiliary power source, such as a diesel generator, is brought on line.

9 Claims, 5 Drawing Sheets

APPARATUS AND METHOD FOR TRANSIENT AND UNINTERRUPTIBLE POWER

BACKGROUND

The present invention relates generally to a transient power supply and, more particularly, to method and apparatus for providing transient power by converting stored kinetic energy into electrical energy.

Typically, electrical devices receive operating power from an external power distribution grid that is coupled to a power generation facility, such as a power plant, for example. From time to time, this external power source can be interrupted, because of a malfunction in the generation facility and/or in the distribution grid, for instance. Accordingly, certain electrical devices are connected to an auxiliary power source, such as a diesel generator or a bank of batteries. Unfortunately, transitioning from the external power supply to the auxiliary power supply is generally not instantaneous and, as such, presents an interval of time during which the electrical devices are without power. For certain critical devices, such as computers or medical devices, even a momentary loss of power can lead to undesirable effects, such as a loss of critical data and/or malfunction of the device.

Accordingly, these critical devices traditionally have been coupled to a transient power supply, which is often referred to as an uninterruptible power supply (UPS) by those of ordinary skill of art in the industry. In summary, a transient power supply (i.e., UPS) provides operating power to the critical device from when the primary power is lost to the time at which the auxiliary power is brought on-line. Traditionally, battery banks have been employed to provide this transient power. As another example, certain flywheel devices have been employed to provide transient power.

Traditional flywheel devices include a rotating flywheel that is coupled to a generator and a motor. During normal operation, the motor operates off of main or primary power and energizes (i.e., kinetic energy of rotation) the flywheel. However, when power is lost, the flywheel remains in motion and operates a traditional generator, which generates power by rotating a permanent magnet or electromagnet within a stator core to induce current within stator windings disposed around the permanent magnet or electromagnet.

Unfortunately, traditional transient or UPS power sources are not without drawbacks. For example, battery banks that provide sufficient levels of power can be relatively expensive to purchase and maintain and, furthermore, often consume relatively large areas of floor space. In an industrial setting, for instance, cost and floor space are relevant concerns. As another example, traditional flywheel devices often require the maintenance of high rotation rates to generate sufficient and appropriate power. Accordingly, traditional flywheel devices often employ vacuum chambers to reduce the dissipation of kinetic energy from the flywheel due to air resistance, for example. Additionally, traditional flywheel devices employ a motor to energize the flywheel and a separate permanent magnet generator to convert the kinetic energy of the flywheel in to electrical power. By using two distinct devices (i.e., the generator and the motor), traditional systems bear a greater cost, and the use of the permanent magnet also increases the cost of the system. Furthermore, maintaining a vacuum condition for the flywheel increases the cost and likelihood of failure for the system.

Therefore, there exists a need for improved methods and apparatus for providing a transient power supply to certain electrical devices.

BRIEF DESCRIPTION

In accordance with one exemplary embodiment, the present technique provides a power supplying apparatus. The exemplary power supplying apparatus includes a kinetic energy storage device, such as a rotatable flywheel. The exemplary power supplying apparatus also includes a rotor that is disposed in a stator and that is mechanically coupled to the kinetic energy storage device. The exemplary stator includes stator windings that receive power from a power source that is capable of providing alternating current (ac) power to the stator windings at variable frequencies to generate power by converting the kinetic energy of the flywheel into electrical energy.

During standard operation conditions, the exemplary power supplying apparatus functions as an induction motor, thereby energizing the kinetic energy storage device. However, if the external power supply to the apparatus is lost, then the exemplary apparatus functions as a transient power supply to coupled loads. By way of example, the energized flywheel (i.e., the kinetic energy device) continues to rotate even after a loss of external power and, as such, causes the rotor, which is mechanically coupled to the flywheel, to rotate as well. By providing ac power to the stator windings at an appropriately selected frequency, the exemplary power supplying device acts as an induction generator, for example. That is, the rotation of the rotor by the flywheel in conjunction with providing ac power at the appropriate frequency causes the rotor to rotate faster than the synchronous speed of the apparatus and, as such, generates ac power. This generated ac power is, by way of example, fed to a downstream load, thereby providing transient operating power to the downstream load during the loss of primary power, for instance.

In accordance with another exemplary embodiment, the present invention provides a method for providing transient power to a downstream load. The exemplary method includes the act of energizing a kinetic energy storage device, such as a rotatable flywheel. By way of example, the exemplary flywheel is coupled to a rotor of an electric machine, such as an induction device. In the exemplary method, providing ac power to the stator windings of the induction device induces current in the rotor and, in turn, causes the rotor to rotate. However, upon the loss of external operating power, for instance, the exemplary method actuates the rotor via the rotational energy stored in the flywheel. In cooperation with this actuation, the exemplary method includes that act of transmitting ac power to the stator winding at a selected frequency to generate power from the electric machine. That is, the ac power is transmitted at a frequency that causes the electric machine to operate as an induction generator and produce a transient operating power for the downstream load, for instance.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, the present invention provides methods and apparatus for providing power to loads. Although the following discussion focuses on providing transient power to a load, the present invention affords benefits to a number of power generation scenarios. Furthermore, the following discussion merely provides exemplary embodiments, and these examples are not intended to limit the scope of the appended claims. Additionally, as a preliminary matter, the definition of the term "or" for the purposes of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "'A' or 'B'" includes: "A" by itself, "B" by itself, and any combination thereof, such as "AB" and/or "BA."

Figure 1:
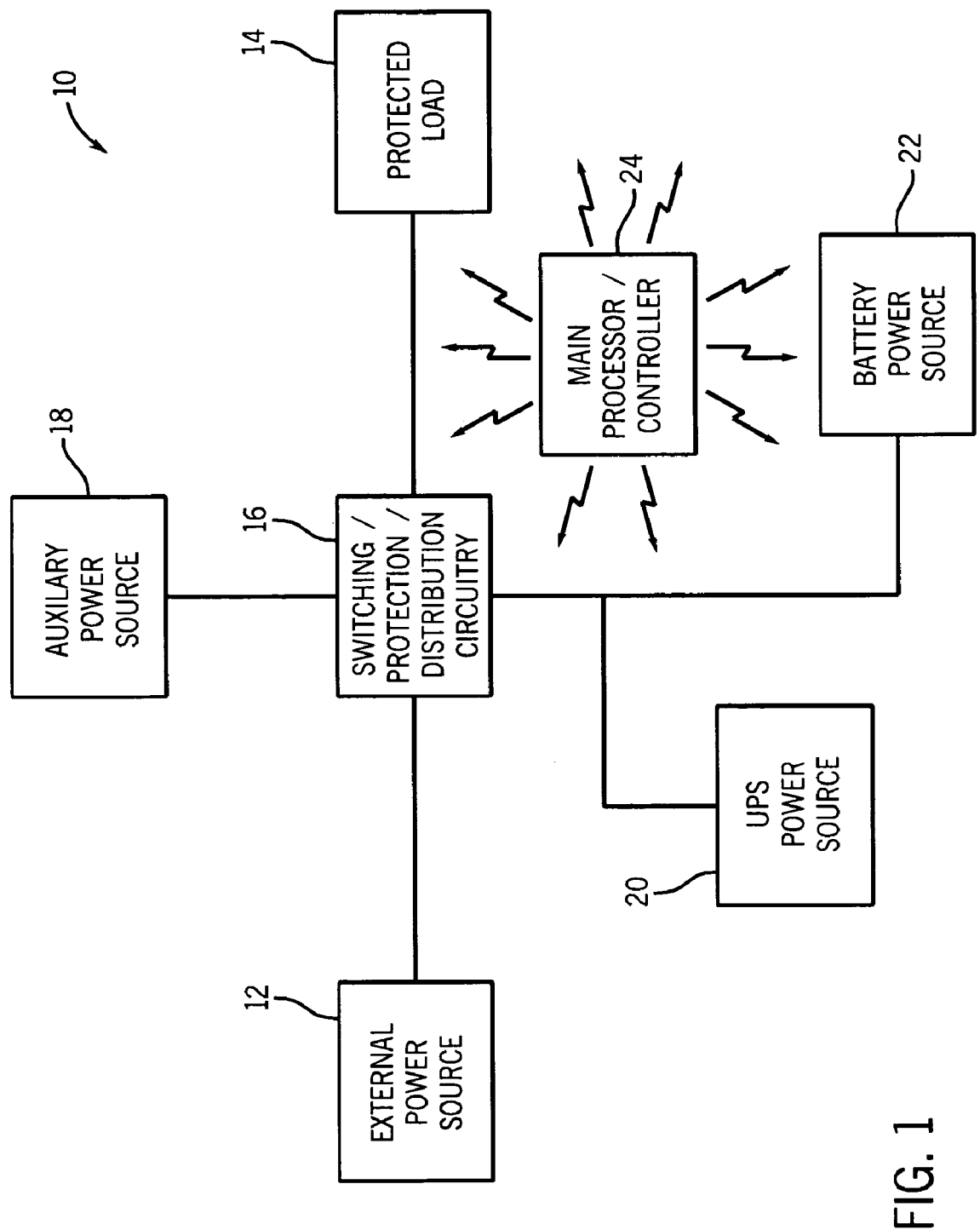
FIG. 1 is a schematic of a power distribution system for a protected load, in accordance with an embodiment of the present invention.

Turing to the figures, FIG. 1 is a diagrammatic representation of a power distribution system 10. By way of example, the exemplary power system 10 is representative of a power distribution system in any number of facilities where continuous (i.e., uninterrupted) power distribution is a concern. For example, facilities such as hospitals, data centers and emergency facilities generally benefit from uninterrupted power. The exemplary power distribution system 10 includes an external power source 12, such as a power generation plant, that provides operating power to a protected load 14 during conventional operating conditions. For example, the external power source 10 provides ac power to the protected load 14, which may be a medical device, a data storage computer or a communications device, to name but a few examples. To manage the distribution of operating power to the protected load, the power distribution system 10 includes switching/protection/distribution circuitry 16. The switching/protection/distribution circuitry 16 provides an electrical conduit for providing operating power to the protected load 14 from various power sources, which are discussed further below.

Under certain conditions, the external power source 12 can be lost. For example, in the event of a power outage or a transmission line failure, external power from the external power source 12 is no longer available to the protected load 14. Indeed, due to certain events, such as weather events, external power may be lost for relatively long durations of time. To mitigate the effects of a loss of external power, the exemplary power distribution system 10 includes an auxiliary power source 18, such as a diesel generator. Advantageously, the exemplary auxiliary power source 18 is capable of providing operating power to the protected load for extended periods of time. However, delays in activating the auxiliary power source 18 from the time of loss of external power leaves the protected load 14 without operating power during this interval. For example, in the case of a diesel generator, a period of seconds may pass between the time external power is lost and the time the diesel generator is capable of providing operating power (i.e., brought on-line). This lag time can cause the protected load to deactivate, leading to a loss of data, for instance.

To provide operating power during this transition between power sources, the exemplary power distribution system includes an uninterruptible power supply (UPS) power source 20. As discussed further below, the UPS 20 provides transient operating power to the protected load from the time when external power is lost to the time the auxiliary power source 18 is brought on-line. Accordingly, the protected load 14 in the exemplary power distribution system 10 never realizes a loss of operating power. Additionally, the protected load 14, in the exemplary power distribution system 10, receives transient power from a battery power source 22. However, it is worth noting that the battery power source 22 is included as an optional component in the exemplary embodiment, and other embodiments of the present technique can be configured to receive all transient power from the UPS power source 20 and, as such, do not include a battery power source 22.

To manage and/or monitor the various power sources as well as the protected load, the exemplary power distribution system 10 includes a main processor/controller 24 that is in communication with the various components of the power distribution system 10. In the exemplary power distribution system 10, the main processor/controller includes logic circuitry configured to automate control and monitoring the power distribution system 10. Advantageously, the exemplary main processor/controller 24 is configured to communicate with remote locations via a network, for example.

Figure 2:
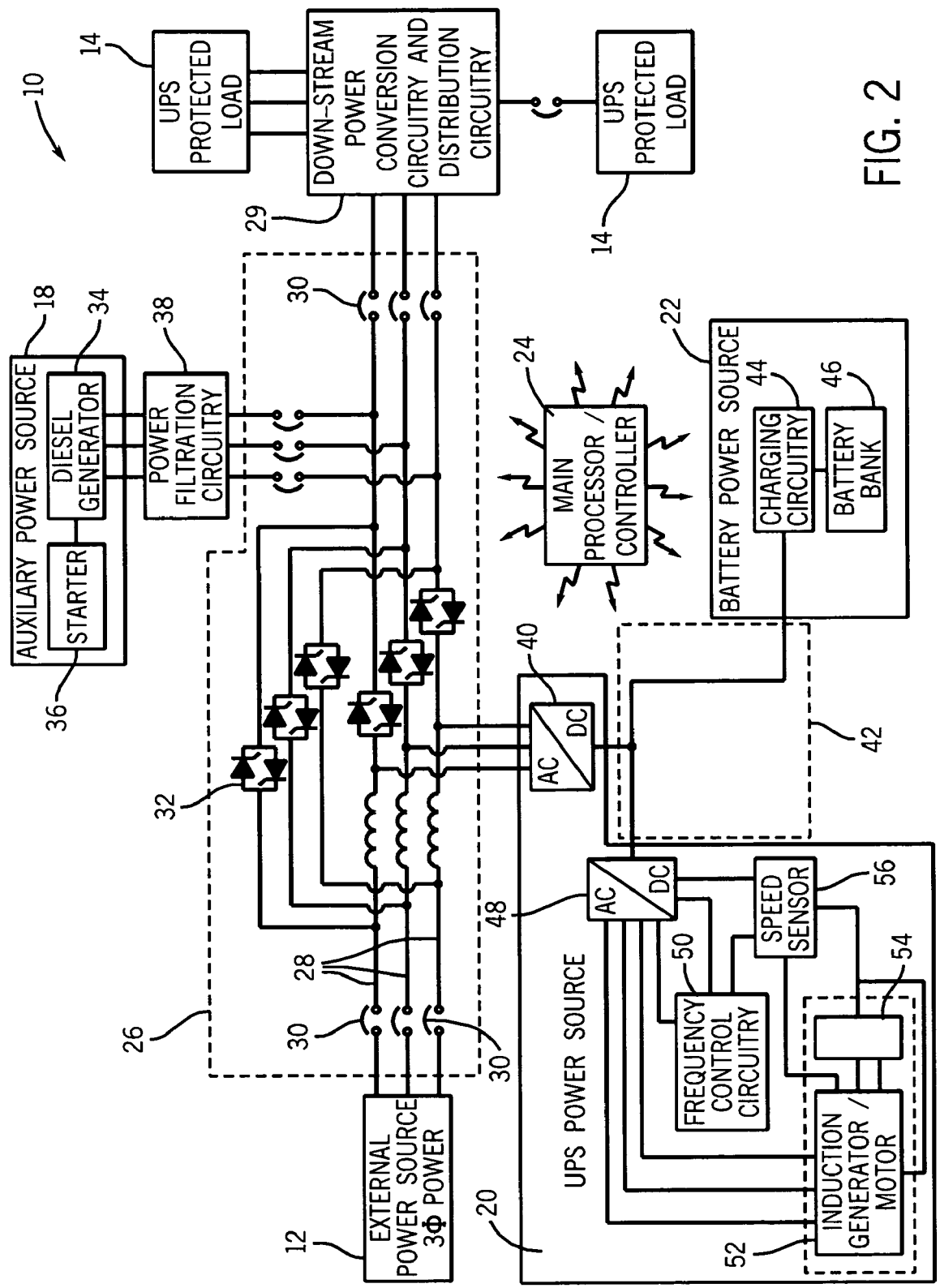
FIG. 2 is a schematic of a power distribution system for a protected load, in accordance with an embodiment of the present invention.

FIG. 2 illustrates in further detail an exemplary power distribution system (PDS) 10. In the exemplary PDS 10, the external power source 14 provides three-phase 480 Vac power to the system, and this power is distributed throughout the system over an ac bus 26. The exemplary ac bus 26 includes three conductive pathways 28, each of which carries one phase of the three-phase power. In the exemplary embodiment, the ac bus 26 electrically communicates with downstream power conversion and distribution circuitry 29 that provides power to various UPS protected loads. For example, the exemplary downstream power conversion and distribution circuitry 29 provides three-phase ac power to one UPS protected load 14, while providing single-phase ac power to another UPS protected load 14. As will be appreciated by those of ordinary skill in the art in view of the following discussion, the exemplary PDS 10 may include any number of protected loads 14 operating at any number of power levels.

The exemplary ac bus 26 includes switching/distribution/protection (SDP) circuitry 16 to manage the transmission of operating power to the protected loads 14. For example, the ac bus 26 includes fuses 30 that mitigate the likelihood of improper power levels affecting the various components of the PDS 10. However, these fuses 30 are merely one example of protection circuitry and devices, which include circuit breakers and interruption devices, to name but a few devices. The exemplary ac bus 26 also includes static transfer switches 32, which are under the direction of the main processor/controller 24, for example. The exemplary static transfer switches 32 control from which power source (e.g., the external power source 12, the UPS power source 20 and/or the auxiliary power source 18) the protected loads 14 receive operating power. Of course, the static transfer switches 32 are merely one example of a switching circuit or device, and those of ordinary skill in the art may envisage any number of devices in view of the present discussion.

As discussed above, to mitigate the effects of a loss of the external power source 12, the PDS 10 includes an auxiliary power source 18. In exemplary embodiment, the auxiliary power source 18 includes a diesel generator 34 that is coupled to a motor starter 36. Thus, in the event external power is lost, the main processor/controller 24 instructs the motor starter 36 to activate the diesel generator, for instance. In the exemplary PDS 10, power filtration circuitry 38 located electrically between the diesel generator 34 and the ac bus 26 conditions the power generated by the diesel generator 34 to an appropriate level for the ac bus 26. Unfortunately, the exemplary diesel generator 34 does not instantaneously reach an operational state, i.e., a state at which the generator 34 is capable of providing operating power.

Accordingly, the exemplary PDS 10, as discussed above, includes the UPS power source 20. The exemplary UPS power source 20, via the ac bus 26, provides transient operating power to the UPS protected loads 14 and, as such, bridges the interval between the loss of external power and the activation of the diesel generator 34.

During conventional operations (i.e., operating under external power), the UPS power source 20 receives external operating power via the ac bus 26. In the exemplary UPS power source 20, first power conversion circuitry 40, which is bi-directional, receives ac power from the ac bus 26 and converts this ac power into dc power. By way of example, the exemplary first power conversion circuitry 40 rectifies 480 Vac power into 800 V dc power. As will be appreciated by those of ordinary skill in the art, the exemplary first power conversion circuitry 40 includes an assembly of inverters and rectifiers that appropriately condition the input power to a desired output level. Indeed, any number of input power levels can be converted into any number of output levels, in accordance with the appropriate design parameters of a given system.

In the exemplary embodiment, this dc power is then distributed to various components of the PDS 10 over a dc bus 42. As one example, the dc bus 42 is in electrical communication with the battery power source 22. Accordingly, during conventional operations, the dc bus 42 feeds dc power to exemplary charging circuitry 44 that, in turn, charges a battery bank 46. By way of example, the exemplary battery power source 22 includes rechargeable nickel-cadmium batteries; of course, other types of batteries may be envisaged.

The dc bus 42 also feeds into and communicates with second power conversion circuitry 48 of the UPS power source 20. Like the first power conversion circuitry 40, the exemplary second power conversion circuitry 48 includes appropriately arranged rectifiers and inverters and is bi-directional. This exemplary second power conversion circuitry 48, during conventional operating conditions, is configured to receive dc power from the dc bus 42 and output three-phase ac power at a variable frequency. To select the frequency of the output ac power, the exemplary UPS power source 20 includes frequency control circuitry 50, which is in communication with the main processor/controller 24.

The ac power output from the second power conversion circuitry 48 provides operating power to an induction device 52 that operates as an induction motor during conventional operating conditions. That is, the exemplary second power conversion circuitry 48 provides power to the stator windings of the exemplary induction device 52 to cause rotation of the rotor of the induction device. (See FIG. 4.)

In the exemplary UPS power source 20, the induction device 52 is mechanically coupled to a kinetic energy storage device, such as the illustrated flywheel 54. Accordingly, during conventional operations, induction device 52 acts as an induction motor and energizes the flywheel 54. That is, the rotation of the rotor (See FIG. 4) of the induction device causes the flywheel 54 to rotate as well. To monitor the operation of the induction device 52 or the flywheel 52, the exemplary UPS power source includes sensing devices, such as the illustrated speed sensor 56. The exemplary speed sensor 56 is configured to determine a rotational rate (i.e., rotations per minute) of the rotor or the flywheel, for example. Advantageously, the exemplary speed sensor 56 is in communication with the main processor/controller 24. Advantageously, the induction device when operating as an induction motor may be harnessed to operate a given piece of machinery, such as a pump element, for example.

Figure 3:
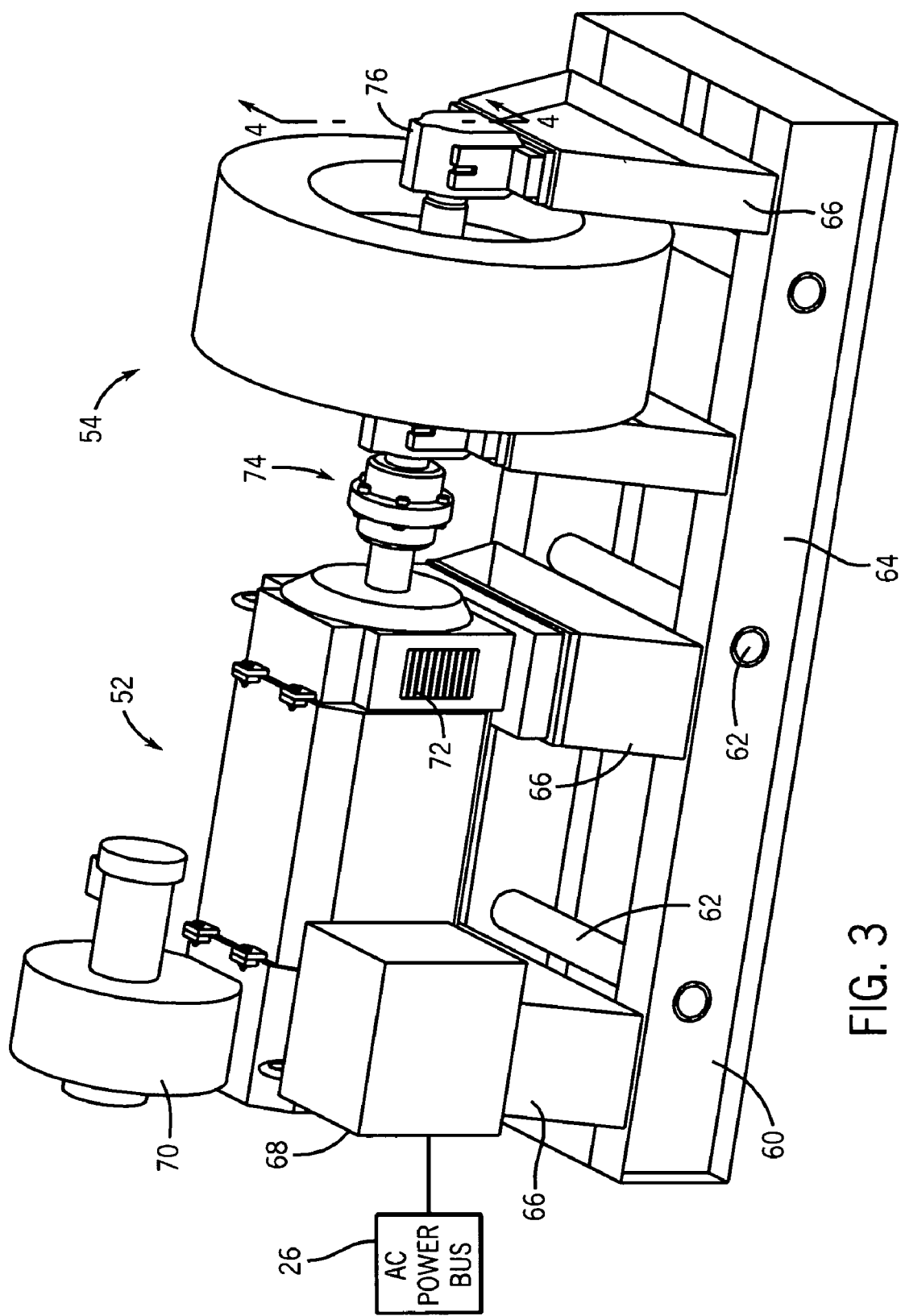
FIG. 3 is a perspective view of a transient power supply device, in accordance with an embodiment of the present invention.

FIG. 3 illustrates an exemplary induction device 52 and flywheel assembly 54. The exemplary assembly includes a base 60 onto which the induction device 52 and flywheel 54 are mounted. To increase the structural integrity of the assembly, the base 60 includes a series of struts 62 disposed between legs 64 of the base 60. To support the induction device 52 and the flywheel 54, the exemplary assembly includes trapezoidal shaped mounting structures 66 that secure these components to the base 60.

The exemplary induction device 52, as discussed further below, is an induction generator/motor. To facilitate electrical communications to and from the exemplary induction device 52, a conduit box 68 is included. By way of example, the conduit box 68 includes connections to couple the exemplary induction device 52 to the ac power bus 26 and, as such, facilitates the receipt of operating power and the transmission of generated power, for instance. Advantageously, the exemplary induction device 52 includes a cooling system 70 that draws air into the induction device 52 and expels the air from a vent 72 located at the opposite end of the device 52. Indeed, in the exemplary induction device 52, the cooling system 70 draws in air and generates airflow through the device 52, as represented by directional arrows 73. (See FIG. 4.)

The exemplary induction device 52 is mechanically coupled to the flywheel 52 via a shaft assembly 74. Although the present embodiment illustrates a single flywheel, embodiments with two or more flywheels are envisaged. Indeed, the induction device 52 may be coupled to a pair of flywheels that are disposed on opposite ends of the induction device 52. Furthermore, it is envisaged that the rotor, via the shaft assembly 74, can be coupled to a gearbox, for example, that distributes the torque of the rotor to any number of flywheels 54. Advantageously, the use of multiple flywheels facilities the use of smaller flywheels in maintaining a desired amount of stored kinetic energy within the system.

The shaft assembly 74 mechanically correlates the rotation of the rotor (see FIG. 4) of the induction device 52 with the rotation of the flywheel 54. That is to say, the rotational rate (e.g., rpm) of the rotor corresponds with the rotational rate of the flywheel 54, for example. However, the induction device 52 and the flywheel may be mechanically coupled via other mechanical assemblies, such as gears and speed reducers, that impact the rotations rates of the rotor and the flywheel with respect to one another. Additionally, as discussed further below, the exemplary flywheel 54 includes bearing assemblies 76 that are coupled the mounting structures 66 and that facilitate rotational movement of the flywheel 54.

Figure 4:
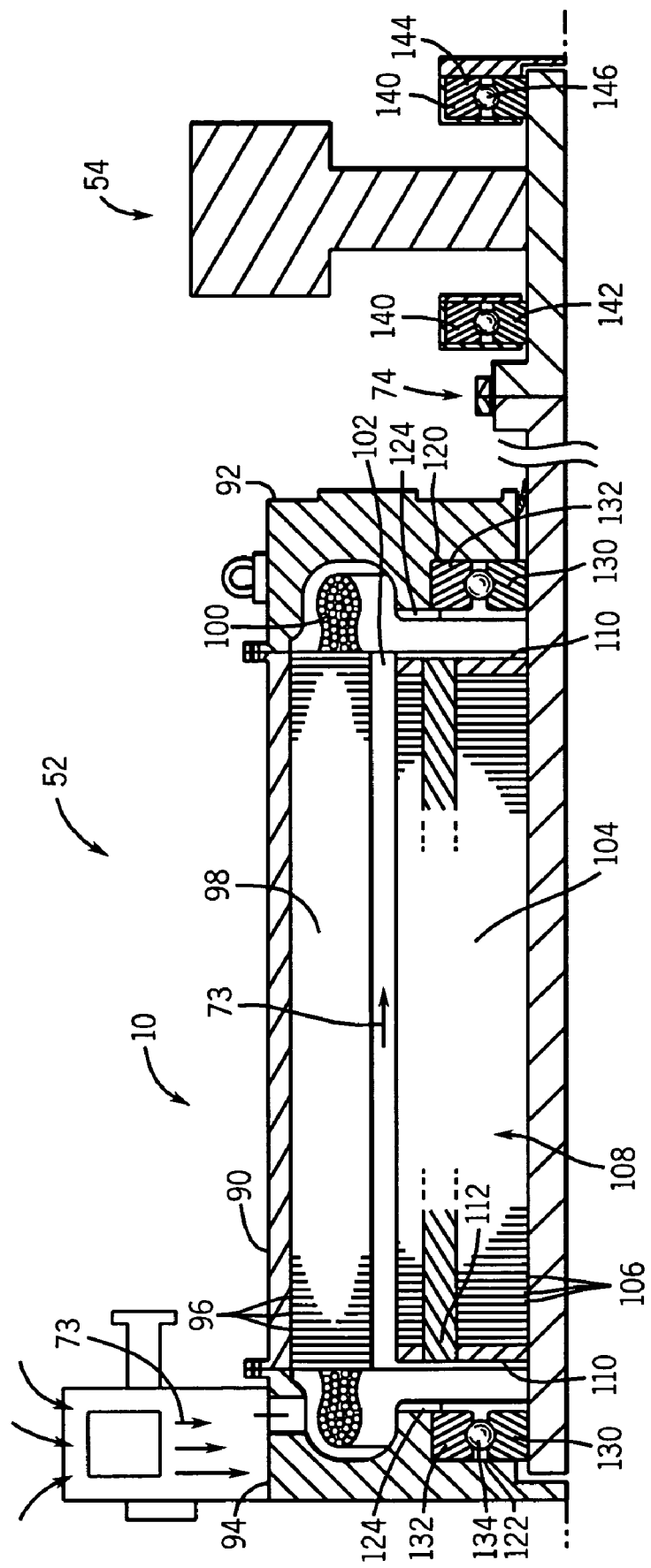
FIG. 4 is a cross-sectional view of a the transient power supply device of FIG. 3 along line 4—4.

FIG. 4 provides a partial cross-section view of the induction device 52 and flywheel 54 along line 4—4. To simplify the discussion, only the top portions of the induction device 52 and flywheel 54 are shown, because the structures of these components are essentially mirrored along their respective centerlines.

Beginning with the exemplary induction device 52, it includes a frame 90 and drive-end and opposite drive-end endcaps 92 and 94 respectively. These endcaps 92 and 94, in cooperation with the frame 90, provide an enclosure or device housing for the exemplary induction device 52. Within the enclosure or device housing resides a plurality of stator laminations 96 juxtaposed and aligned with respect to one another to form a stator core 98. The stator laminations 96 each include features that cooperate with one another to form slots that extend the length of the stator core 98 and that are configured to receive one or more turns of a coil winding 100, illustrated as coil ends in FIG. 4. These coil windings 100 are in electrical communication with the ac bus 26 (see FIG. 3). Accordingly, the coil windings 100 receive operating power from the ac bus 26 and provided generated power to the ac bus 26, as discussed further below. Each stator lamination 96 also has a central aperture. When aligned with respect to one another, the central apertures of the stator laminations 96 cooperate to form a contiguous rotor passageway 102 that extends through the stator core 98.

In the exemplary induction device 52, a rotor 104 resides within this rotor passageway 102. Similar to the stator core 98, the rotor 104 has a plurality of rotor laminations 106 aligned and adjacently placed with respect to one another. Thus, the rotor laminations 106 cooperate to form a contiguous rotor 108. The exemplary rotor 104 also includes rotor end rings 110, disposed on each end of the rotor 104, that cooperate to secure the rotor laminations 106 with respect to one another. The exemplary rotor 104 also includes rotor conductor bars 112 that extend the length of the rotor 104. In the exemplary induction device 52, the end rings 110 electrically couple the conductor bars 112 to one another. Accordingly, the conductor bars 112 and the end rings 110 comprise nonmagnetic, yet electrically conductive materials and form one or more closed electrical pathways. As discussed below, routing alternating current through the stator windings 100 induces current in the rotor 104, specifically in the conductor bars 112, and causes the rotor 104 to rotate. By harnessing the rotation of the rotor 104 via the shaft assembly 74, the flywheel 54 rotates as well. Conversely, rotating the rotor 104 at a rate above the synchronous speed of the induction device, which is a function of the input ac power fed to the stator windings 100, causes the induction device 52 to generate power, as discussed further below. Indeed, those of ordinary skill in the art will appreciate that the synchronous speed ($N_s$; as measure in rotations per minute) of an induction device is generally defined by the follow equation:

$$N_s = \frac{120(F)}{P},$$

in which F represents the frequency of the input ac power in Hertz and P represents the even integer number of poles of the induction device.

To support the rotor 104, the exemplary induction device 52 includes drive-end and opposite drive-end bearing sets 120 and 122 that are secured to the shaft assembly 74 and that facilitate rotation of the rotor 104 within the rotor passageway 102. By way of example, the exemplary bearing sets 120 and 122 have a ball bearing construction; however, the bearing sets may have a sleeve bearing construction, among other types of bearing constructions. Advantageously, the endcaps 92 and 94 include features, such as the illustrated inner bearing caps 124, that releasably secure the bearing sets 120 and 122 within their respective endcaps 92 and 94. The exemplary bearing sets 120 and 122 transfer the radial and thrust loads produced by the rotor 104 to the device housing. Each exemplary bearing set 120 and 122 includes an inner race 130 disposed circumferentially about the shaft assembly 74. The fit between the inner races 130 and the shaft assembly 74 causes the inner races 130 to rotate in conjunction with the shaft assembly 74. Each exemplary bearing set 120 and 122 also includes an outer race 132 and rolling elements 134 disposed between the inner race 130 and the outer race 132. The rolling elements 134 facilitate rotation of the inner races 130, while the outer races 132 remain stationary with respect to the endcaps 92 and 94. Thus, the bearing sets 120 and 122 facilitate rotation of the shaft assembly 74 and the rotor 104 while providing a support structure for the rotor 104 within the device housing, i.e., the frame 90 and the endcaps 92 and 94. To improve the performance of the bearing sets 120 and 122, a lubricant coats the rolling elements 134 and races 130 and 132, providing a separating film between to bearing components, thereby mitigating the likelihood of seizing, galling, welding, excessive friction, and/or excessive wear, to name a few adverse effects.

The shaft assembly 74, in the exemplary embodiment, mechanically couples the rotor 104 to the flywheel 54. That is to say, the rotation of the rotor 104 causes the flywheel 54 to rotate, and, conversely, rotation of the flywheel 54 causes the rotor 104 to rotate. The exemplary flywheel 54 includes bearing sets 140, which each includes an inner race 142, an outer race 144, and a rolling elements 146 disposed therebetween. Similar to the bearing sets 120 and 122, the inner races 142 rotate in conjunction with the shaft assembly 74, while the outer races 144 remain stationary. Advantageously, the components of the exemplary bearing sets 140 are coated with a lubricant, to mitigate the likelihood of seizing, galling, welding, excessive friction, and/or excessive wear, to name a few adverse effects.

Focusing on the exemplary flywheel 54, it is designed to store and transfer kinetic energy. Accordingly, the exemplary flywheel 54 is formed of composite materials suited to maintain the inertial rotation of the flywheel. Of course, those of ordinary skill in the art in light of the present discussion will appreciate that the flywheel 54 may be formed of any number of suitable structural materials. Furthermore, such skilled artisans will also appreciate that the I-shaped cross-section design of the exemplary flywheel is merely but one example of a flywheel design.

Figure 5:
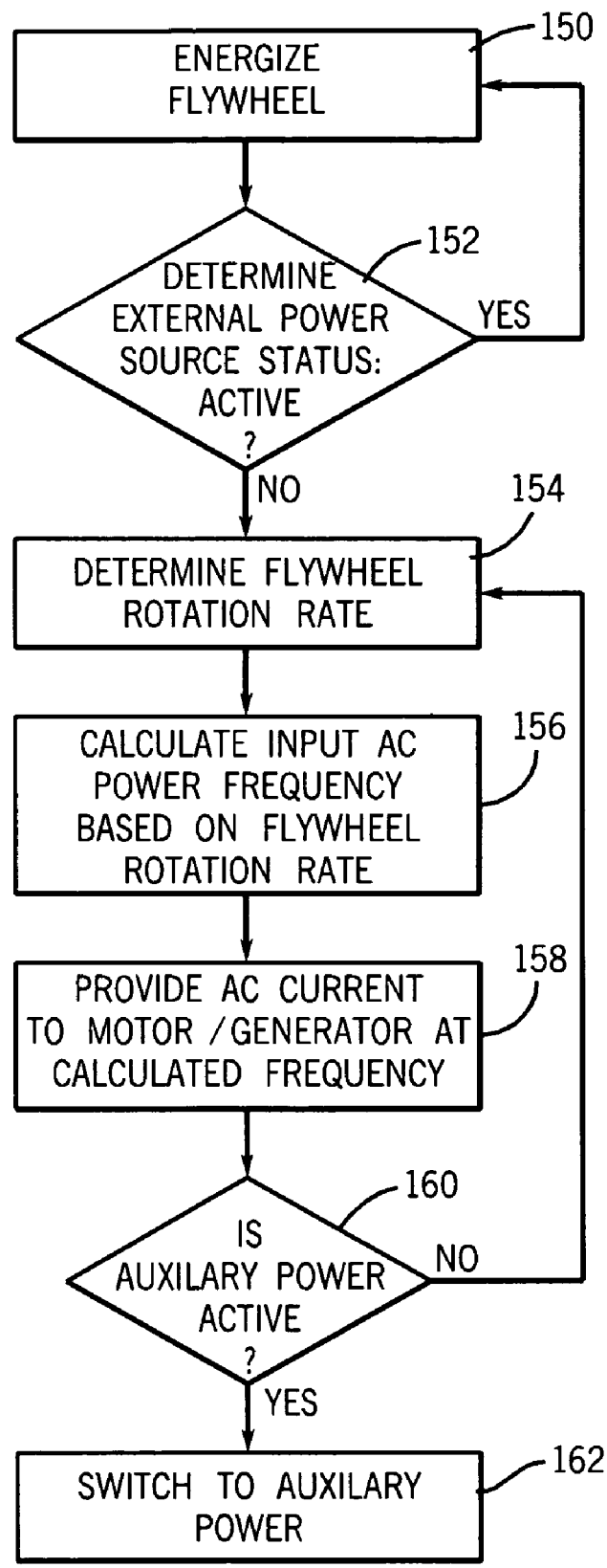
FIG. 5 is a block diagram of an exemplary process for providing transient power, in accordance with an embodiment of the present invention.

With the foregoing figures (i.e., FIGS. 1–4) in mind, FIG. 5 illustrates an exemplary process for operation of the exemplary UPS power source 20 within the exemplary power distribution system 10. As discussed above, during conventional operating conditions, the ac power bus 26 provides ac power from the external power source 12 to the stator windings 100 of the induction device 52. More specifically, in the exemplary induction device 52, the ac bus 26 provides ac power to the first power conversion circuitry 40, which coverts the inputted ac power to a dc power. Via the dc bus 42, this dc power is provided to second power conversion circuitry 48, which converts the inputted dc power into an ac power at a desired frequency. This ac power is then provided to the stator windings 100, inducing current in the conductor bars 112 and causing the rotor 108 to rotate. Because the shaft assembly 74 mechanically couples the rotor 104 to the flywheel 54, the flywheel 54 rotates at the rotational rate (i.e., rpm) of the rotor 104. Thus, the electrical energy from the external power source 12 is converted into kinetic energy and stored in the flywheel 54. That is to say, the flywheel 54 is energized, as represented by Block 150. If the external power source is providing power to the PDS 10, the then UPS power source 20 remains in the energizing state, as represented by Block 152.

However, if a loss of external power is detected, by the main processor/controller 24, for instance, then the UPS power source 20 switches to a fault status state, as represented by Block 152. In the event of a fault status state (i.e., a loss of external power), the stator windings 100 no longer receive ac power from the external power source via ac power bus 26. However, the kinetic energy stored in the rotating flywheel 54 continues to rotate the rotor 104, because the rotor 104 is coupled to the flywheel. As discussed above, the exemplary speed sensor 56 monitors and detects the rotational rate of the flywheel 54 in rotations per minute (rpm), for instance, as represented by block 154. (As will be appreciated by those of ordinary skill in the art in view of the present discussion, the exemplary flywheel 54 and the exemplary rotor 104 rotate at the same rate, which is measured in rpm.)

Immediately upon the loss of external power, the frequency control circuitry 50, in response to inputs from the speed sensor 56 and/or the main processor/controller 24, directs the exemplary second power conversion circuitry 48 to adjust the output frequency thereof, to generate power from the induction device 52. That is, the frequency controller 50 directs the second power conversion circuitry 48 to output ac power at a frequency such that the rotor 104 is rotating faster than the synchronous speed of the induction device 52. Again, the synchronous speed of the induction device 52 is partially defined by the frequency of the ac power provided to the stator windings 100. Thus, by selecting a frequency that defines a synchronous speed for the induction device 52 that is less than the rotation rate of the flywheel, the induction device 52 acts as an induction generator and, as such, provides a generated ac power to the second power conversion circuitry 48. As the flywheel 54 loses kinetic energy and slows down, the speed sensor 56 monitors this reduction in speed and calculates an ac frequency that maintains operation of the induction device 52 as an induction generator. Blocks 156 and 158 represent these steps of the exemplary process.

In the exemplary process, the second power conversion circuitry 48 receives the generated ac power and converts this power to dc power for transmission over the dc bus 42. The first power conversion circuitry 40 then receives the dc power from the dc bus 42 and converts the input dc power into an ac power appropriate for the ac bus 26, which distributes the power to downstream locations, such as the UPS protected loads 14.

The exemplary process also includes activating the auxiliary power source 18, such as the exemplary diesel generator 34. By way of example, the exemplary diesel generator 24 is activated via a motor starter, which takes a few seconds to bring the diesel generator online, for instance. Accordingly, the UPS power source 20 provides a bridge between the time at which external power is lost and the time that the auxiliary power is brought on-line. Once the auxiliary power source is brought on-line, the PDS 10 obtains its operating power from the auxiliary power source, as represented by Blocks 160 and 162.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for providing transient power to a load, comprising:
    energizing a kinetic energy storage device that is mechanically coupled to a rotor of an electric machine;
    actuating the rotor via the kinetic energy storage device;
    providing alternating current (ac) power at a selected frequency to stator windings disposed in a stator of the electric machine to generate power from the electric machine; and
    conditioning the generated power to match the frequency and voltage of an external alternating current power configured to provide operating power to a load during operation.

2. The method as recited in claim 1, comprising sensing a parameter of the kinetic energy storage device or the rotor and basing the selected frequency on the parameter.

3. The method as recited in claim 2, comprising determining the rotational rate of the rotor.

4. The method as recited in claim 2, comprising rectifying generated power from ac power to direct current (dc) power.

5. The method as recited in claim 4, comprising inverting dc power to ac power.

6. A method for providing transient power to a load, comprising:
    energizing a rotatable flywheel that is coupled to a rotor of an electric machine;
    monitoring an external power source that provides operating power to the load;
    providing first alternating current (ac) power at a variable frequency to stator windings disposed in a stator of the electric machine to generate second ac power via the electric machine upon loss of the external power; and
    conditioning the second ac power to provide transient operating power to the load.

7. The method as recited in claim 6, comprising sensing an operating parameter of the rotor or the rotatable flywheel and basing the variable frequency on the parameter.

8. The method as recited in claim 6, comprising energizing the rotatable flywheel by inducing a current in electrical conductors extending through the rotor.

9. A system for providing a transient power supply, comprising:
    means for energizing a kinetic energy storage device that is mechanically coupled to a rotor of an electric machine;
    means for actuating the rotor via the kinetic energy storage device;
    means for determining an operating parameter of the kinetic energy device or the rotor;
    means for providing alternating current (ac) power at a selected frequency to stator windings disposed in a stator of the electric machine to generate power, wherein the selected frequency is based on the operating parameter; and
    means for conditioning the generated power to match the frequency and voltage of an external alternating current power configured to provide operating power to a load during operation.

* * * * *